June 24, 1930.　　　W. BENIEN　　　1,768,392
CABLE END CONNECTER
Filed June 27, 1929
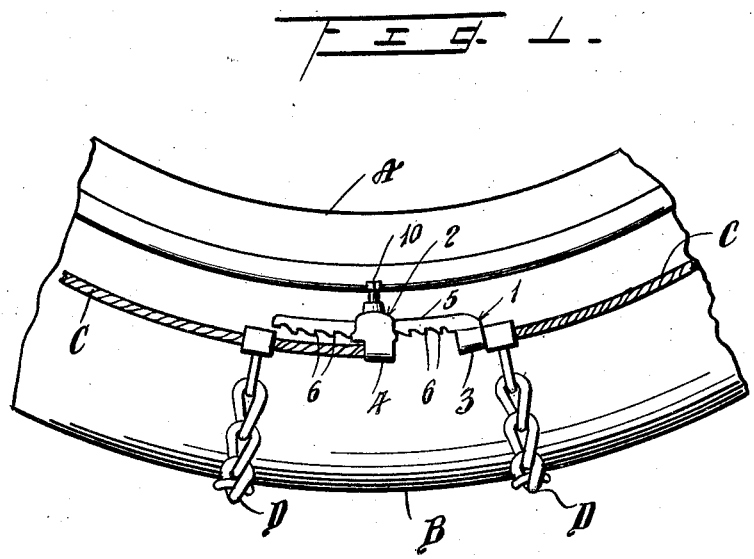
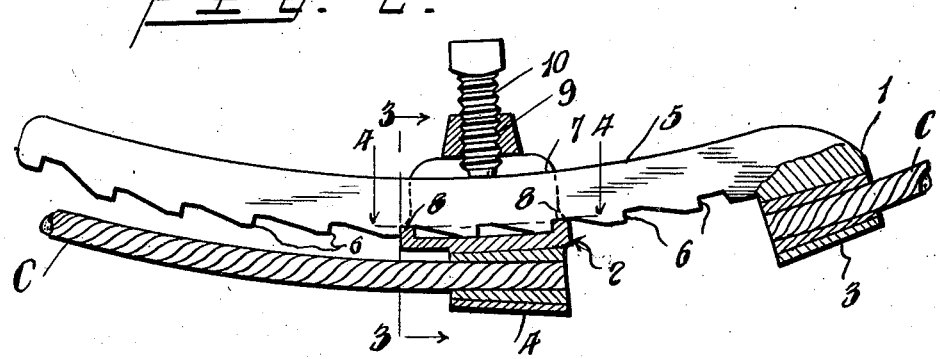
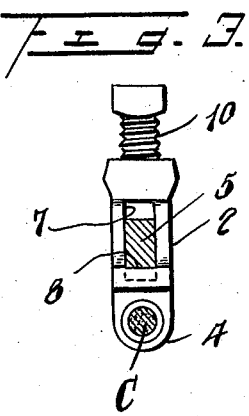
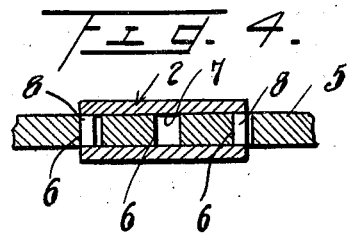
Inventor
W. Benien.
By *[signature]*
Attorney Patented June 24, 1930

1,768,392

UNITED STATES PATENT OFFICE

WILLIAM BENIEN, OF LINCOLN, KANSAS, ASSIGNOR TO STEEL CABLE MUD CHAIN COMPANY, OF LINCOLN, KANSAS, A CORPORATION OF KANSAS

CABLE END CONNECTER

Application filed June 27, 1929. Serial No. 374,145.

The invention relates to a means for connecting the meeting ends of cables and has particular reference to cables used as the side members for anti-skid devices for vehicle wheels, and has for its object the provision of a connecting means that is quickly operated to attach and detach the chains on the wheel and that will securely hold the side cables in position.

A further object of the invention is the provision of a connecter for the ends of cables and other flexible members that includes an arm to be secured to an end of a cable and having a series of shoulders on one side that are equally distanced from each other, and providing on the other cable end a member having an opening to receive the arm and having spaced lugs to engage alternate shoulders and a screw bolt engaging in threaded openings in the second member and adapted to engage the arm on the side opposite to the shoulder and midway between the lugs to the end that a secure connection of the cable ends is effected and the two lugs by engaging spaced shoulders securely hold the parts in fixed relation.

The invention will be described in detail hereinafter and will be found illustrated in the accompanying drawings, in which Figure 1 is a fragmentary side view of a vehicle wheel and tire showing the improved cable end connecter holding the side cable of an anti-skid chain in position, Figure 2 is a view of the cable end connecter on an enlarged scale partly broken away and in section, Figure 3 is a transverse sectional view on a plane indicated by the line 3-3 of Figure 2, and Figure 4 is a sectional detail on a plane indicated by the line 4-4 of Figure 2.

In the drawings similar reference characters are used to designate corresponding parts throughout the several views.

As heretofore stated the primary purpose of the invention is to connect the meeting ends of cables used as side members for antiskid chains for automobile wheels, but it will be apparent that the device may be used for connecting other flexible members.

In Figure 1 is shown a fragment of a wheel A having a tire B on which is mounted an anti-skid device including a side cable C and cross chains D. The connecter comprises two members 1 and 2, each of which is provided with a socket 3 and 4, respectively, in which is clamped the meeting ends of the cable C. The member 1 is provided with an arm 5 for connecting the meeting ends of the side cable C and is preferably formed arcuate to correspond to the curvature of the wheel A and has a series of shoulders 6 on its outer side. The member 2 is provided with an opening 7 through which the arm 5 is extended in connecting the meeting ends of the cable C, and is also provided with spaced lugs 8 that are so arranged that they engage alternate shoulders 6 on the arm 5, said shoulders 6 being equally distanced from each other so that each of the lugs 8 are in engagement with shoulders 6 when the connecter is assembled as shown in Figure 2. The member 2 is provided with a threaded opening 9 in which is secured a screw bolt 10 that by engagement with the inner side of the arm 5 holds the arm 5 in position so that the lugs 8 are engaged with the shoulders 6. It will be noted that the screw bolt 10 is so arranged that it engages the arm 5 midway between the lugs 8 and this arrangement provides means by which a double engagement of the arm 5 by the lugs 8 is secured thereby making a connection that will securely hold the ends of the cable together and prevent danger of stripping of the teeth formed by the shoulders 6 because of strain that may be exerted on the teeth by the cable C.

What is claimed is:—

Means for connecting adjacent ends of cables and the like, comprising a member having means to engage an end of a flexible member, an arm extending from said member, a series of shoulders on one side of said arm and equidistant from one another, another member having means to engage another end of a flexible member, the second member provided with an opening to receive said arm, lugs on said second member extending into said opening and spaced to engage alternate shoulders on the arm, and a screw bolt engaging said second member and engaging the side of said arm opposite to said shoulders and midway between the lugs to hold said lugs and shoulders in engagement.

In testimony whereof I affix my signature.

WILLIAM BENIEN.